United States Patent
Kikinis

(12) 
(10) Patent No.: US 6,483,905 B1
(45) Date of Patent: Nov. 19, 2002

(54) ELECTRONIC DOCUMENT ANSWERING MACHINE

(75) Inventor: Dan Kikinis, Saratoga, CA (US)

(73) Assignee: Lextron Systems, Inc., Saratoga, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,207

(22) Filed: Aug. 13, 1996

(51) Int. Cl.⁷ .......................... H04M 1/64; H04M 11/00
(52) U.S. Cl. ............... 379/93.24; 379/67.1; 379/88.01; 379/88.13; 379/88.17; 379/93.09; 379/185
(58) Field of Search ............................. 379/67, 88, 89, 379/67.1, 88.01, 74, 88.13, 88.17, 93.09, 93.24, 100.05, 100.08, 179, 185, 34, 40, 92.01, 93.35; 709/219, 220, 221, 229

(56) References Cited

U.S. PATENT DOCUMENTS

| | | | |
|---|---|---|---|
| 5,283,638 A | * 2/1994 | Engberg et al. | 348/14 |
| 5,327,486 A | * 7/1994 | Wolf et al. | 379/96 |
| 5,444,768 A | * 8/1995 | Lemaire et al. | 379/68 |
| 5,473,143 A | * 12/1995 | Vak et al. | 235/380 |
| 5,491,820 A | * 2/1996 | Belove et al. | 395/600 |
| 5,511,160 A | * 4/1996 | Robson | 395/162 |
| 5,530,852 A | * 6/1996 | Meske, Jr. et al. | 395/600 |
| 5,557,300 A | * 9/1996 | Satoh | 345/170 |
| 5,557,659 A | * 9/1996 | Hyde-Thompson | 379/88 |
| 5,561,709 A | * 10/1996 | Remillard | 379/96 |
| 5,568,489 A | * 10/1996 | Yien et al. | 370/110.1 |
| 5,568,540 A | * 10/1996 | Greco et al. | 379/89 |
| 5,572,643 A | * 11/1996 | Judson | 395/793 |
| 5,608,786 A | * 3/1997 | Gordon | 379/100 |
| 5,612,730 A | * 3/1997 | Lewis | 348/8 |
| 5,631,745 A | * 5/1997 | Wong et al. | 358/434 |
| 5,651,055 A | * 7/1997 | Argade | 379/88 |
| 5,727,046 A | * 3/1998 | Almulla | 379/88 |
| 5,757,891 A | * 5/1998 | Wang | 379/93.24 |
| 5,758,081 A | * 5/1998 | Aytac | 395/200.41 |
| 5,771,354 A | * 6/1998 | Crawford | 709/229 |
| 5,787,149 A | * 7/1998 | Yousefi et al. | 379/59 |
| 5,799,063 A | * 8/1998 | Krane | 379/88.17 |
| 5,896,444 A | * 4/1999 | Perlman et al. | 379/93.35 |
| 6,052,442 A | * 4/2000 | Cooper et al. | 379/88.19 |

* cited by examiner

Primary Examiner—Krista Zele
Assistant Examiner—Allan Hoosain
(74) Attorney, Agent, or Firm—Donald R. Boys; Central Coast Patent Agency, Inc.

(57) ABSTRACT

An Electronic Document Answering Machine is adapted to connect to remote information sources and to download digital documents including e-mail and WEB pages, and to store the documents for later review by a user. The Answering machine has an alert device for alerting a user that new documents are available for review, and an initializing device for a user to cause documents to be communicated for review one-at-a-time. In a preferred embodiment documents are communicated over a speaker via voice synthesis. In an alternative preferred embodiment a small display is provided wherein documents may be displayed in alphanumeric characters. The answering machine can be implemented as a stand-alone device or can be connected via a serial port to a host PC for transferring documents to the PC for processing and review. In other embodiments the Answering Machine is implemented as a system in a PC, with alert and selective input added as an interface. The interface can be in a keyboard, and can be provided by existing keys and LEDs on a keyboard. An Answering Machine is also provided as a set-top-box for a TV, downloading digital documents from the Internet and providing the documents with user prompting to a TV via an audio/video output, prompting may be by infrared input from a remote controller.

11 Claims, 5 Drawing Sheets

ELECTRONIC DOCUMENT ANSWERING MACHINE

FIELD OF THE INVENTION

The present invention is in the area of computer peripheral devices, and pertains in particular to an electronic device for fetching electronic documents such as e-mail, voice mail, facsimile messages and the like from network servers, particularly Internet servers, at programmed intervals, and signaling a user that such documents are waiting to be reviewed.

BACKGROUND OF THE INVENTION

With the advent of the World Wide Web (WWW) on the Internet, and the increasing popularity of on-line services over telephone lines, E-Mail (electronic mail) and other forms of electronic documents and messages have become a popular form of communication. In the discussion that follows, e-mail is used as a primary example of the sorts of messages and documents that may be processed, but it should be understood throughout that the invention disclosed and taught herein is broadly applicable to electronic documents and messages of all sorts.

Conventionally, E-Mail is a service provided by an Internet provider, that is, a commercial service connected to the Internet that sells or otherwise provides software to users to establish Internet access. NetCom™, America On Line™, and others are examples. An Internet provider has one or more servers, which are specialized computers, connected to phone lines for interconnecting with other Internet servers around the world. A user installs the provider's software on his or her computer, connected by a modem to a telephone line, either ISDN or analog, and executes the software. Typically a user interface queries the user for a password, then establishes and grants access to the Internet through the provider's hardware.

One of the services providers typically make available to their subscribers is E-Mail. Each user has an E-Mail address which is unique to all Internet users, not just those subscribing to a particular provider's service. The service provider makes mass storage space available on an E-Mail server for its own subscriber's, identified by E-Mail address. Internet user's the world over can then send one another E-Mail, which will be saved at each person's service provider's server, and the subscriber may check periodically for new E-Mail, download, save, and print messages, and respond to the sender's messages. There are, as is known in the art, many differences and nuances among E-Mail systems, and new capabilities are being regularly developed and brought to market. Such services are called POP services in the art, for Post Office Protocol.

There are, as stated above, also types of messages other than e-mail which may be electronically transmitted, much as e-mail is accessed and transmitted; among these are facsimile messages and voice mail.

One common difficulty that has not been adequately addressed until the present invention is that it is somewhat cumbersome to access E-Mail, regardless of provider. Typically, to access E-Mail, a subscriber has to turn on the computer connected to a modem, boot the Internet provider's software, enter a password by a user interface, then wait for communication to be established, which typically involves display of an interactive interface, which includes a menu or Icon selection (or both) for activating the E-Mail service. Upon selecting the E-Mail icon, a window appears wherein E-Mail messages are listed in some order, such date and time received.

Once a list of messages is received, a user can select individual messages to read, wherein the actual message is displayed in the E-Mail window or another window; to save, in which case selected messages may be saved to a mass storage device, such as a hard disk drive (HDD); to print, in which case a listed message is downloaded from the remote server and printed on printer connected to the subscriber's computer, or to delete, in which case the selected message or messages are erased at the provider's server. In some systems other options may be available.

In any case, the activity of keeping track of, and responding to E-Mail messages is somewhat cumbersome and time consuming. There are applications known to the inventor which will periodically, on a timed basis, access an E-Mail service and check for waiting messages, and notify a user with an audio or visual alarm, or both, but these facilities require that the user's computer be on, and in many office situations, the user does not wish to leave the computer on.

Even in a situation where a user does have the computer on while at work, the E-Mail access requires logging onto the Internet and accessing the E-Mail server, which might interfere with other activities at the computer.

What is needed is an Electronic Document Answering Machine, having in one embodiment some electronic intelligence, a modem, a relatively small random access memory (RAM) space, a small non-volatile memory, and a minimum operating system. The Electronic Document Answering Machine is implemented in a stand-alone enclosure and connects to a host by a standard serial or parallel port. This unit could be set to access the Internet periodically, check for mail, and have a light and/or audio signal for notifying a user. The unit works whether or not the user's computer is on, and has buttons for playback and the like, wherein a user may have messages read out by synthesized voice. There are many other useful functions such a machine will provide, as disclosed more fully below. Among these functions are receipt and handling of voice mail, facsimile messages, WEB pages, and other sorts of electronic documents and messages as needed, and such a machine could alert a user to the fact of any and all sorts aof such messages waiting to be reviewed.

SUMMARY OF THE INVENTION

In a preferred embodiment of the invention an Electronic Document Answering Machine is provided, comprising a CPU and memory connected by a communication bus; a modem connected to the bus for communicating on a telephone line; an announcement system for communicating stored documents to a user; an alert apparatus for signaling a user that new documents are waiting to be reviewed; and an input device for a user to signal the system to communicate new documents to the user. The CPU, executing stored control code, periodically accesses remote sources over the modem, downloads and stores digital documents in portions of the memory, and activates the alert apparatus as new documents are stored, and wherein the CPU in response to input from a user via the input device, communicates stored documents one-at-a-time to the user. Communication to a user in some embodiments is by voice synthesis using a built-in speaker, and in other embodiments by activation and control of a small, built-in display, or by a combination or selection of methods. Because the machine is connected to a phone line, it is, in some embodiments, also adapted to receive and store voice calls like a conventional answering machine, and facsimile messages, which may be stored and vocalized or displayed like e-mail messages.

The machine may also comprise a serial port for connecting to a host personal computer (PC), wherein the Electronic Document Answering Machine is adapted to communicate stored documents to the PC for processing. In this embodiment the PC may use the device transparently as a modem. The modem in the Answering Machine is preferably without a separate CPU and the Answering Machine CPU serves the modem as well.

The Electronic Document Answering Machine accesses the Internet and downloads e-mail and selected WEB pages for a user, and then plays the documents, such as by audio voice synthesis for e-mail, with prompting from the user. In this way it operates much as a telephone answering machine.

In some embodiments the Answering Machine of the invention is implemented with elements of a host computer, adding the alert and the initializing input. In other embodiments the answering machine is implemented as a set-topbox for a TV. In this embodiment the Answering Machine downloads documents and plays them over the TV as prompted by a user, such as from a remote controller.

The Electronic Document Answering Machine is the first device available that allows regular electronic document message service without having a PC full-on, and also provides an alert in a familiar way. The invention in its several embodiments saves time and money, and performs the necessary functions more efficiently than in the prior art.

DESCRIPTION OF THE PREFERRED EMBODIMENTS

Figure 1:
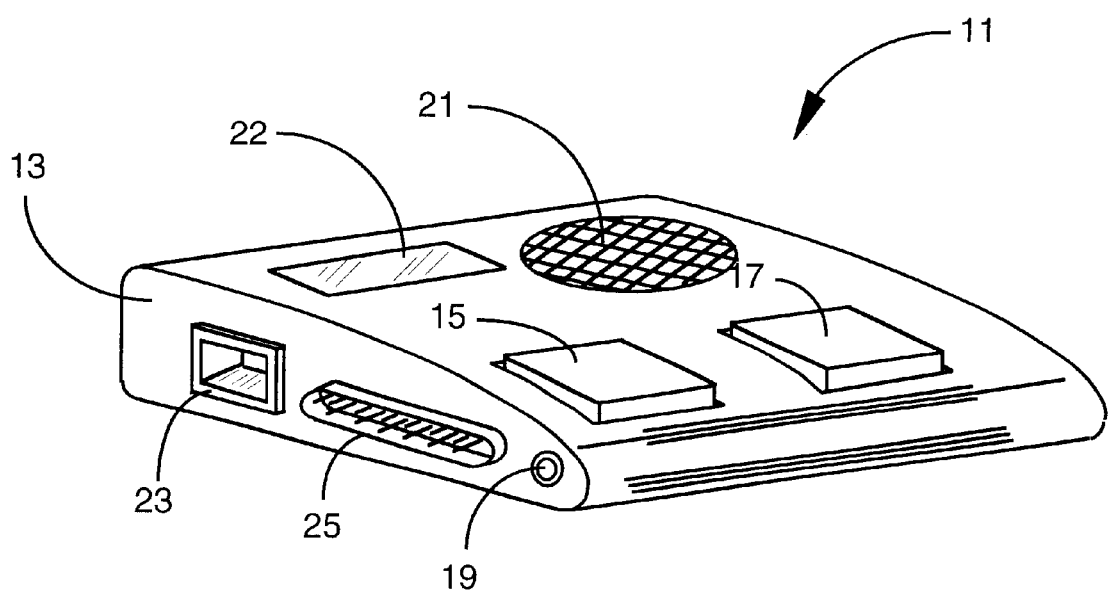
FIG. 1 is an isometric view of an Electronic Document Answering Machine according to one embodiment of the present invention.

FIG. 1 is a block diagram of an Electronic Document Answering Machine 11 according to one embodiment of the present invention. Answering Machine 11 is provided in a small case 13 having the general appearance of answering machines as known in the art. In this embodiment there are two buttons on the Electronic Document Answering Machine, each combined with an LED. Button 15 is an on/off toggle, and is combined with a green LED that lights in the on state. Button 17 is a play button, which, if the Answering Machine is on and there are messages to play, initiates a play mode wherein the Answering Machine plays messages in the order originally received. Playback is by voice synthesis, using techniques known in the art. Button 17 is combined with an LED in this embodiment, controlled by circuitry which causes the LED to blink on and off if there are messages that have not been played.

Electronic Document Answering Machine 11 in this embodiment is, as stated above, a stand-alone device connected to a computer and a telephone line. Accordingly, there is a telephone plug 23 for a telephone line, and a serial port 25 for connection to a serial port of a host computer. In some embodiments the telephone port is an analog telephone port and in some embodiments an ISDN port. Playback is through a speaker 21, and power is provided via a DC input port 19. In some alternative embodiments a small display 22 is provided wherein stored messages may be displayed as alpha-numeric characters, using scrolling techniques, and such a display may be used instead of, or in concert with a speaker such as speaker 21.

Figure 2:
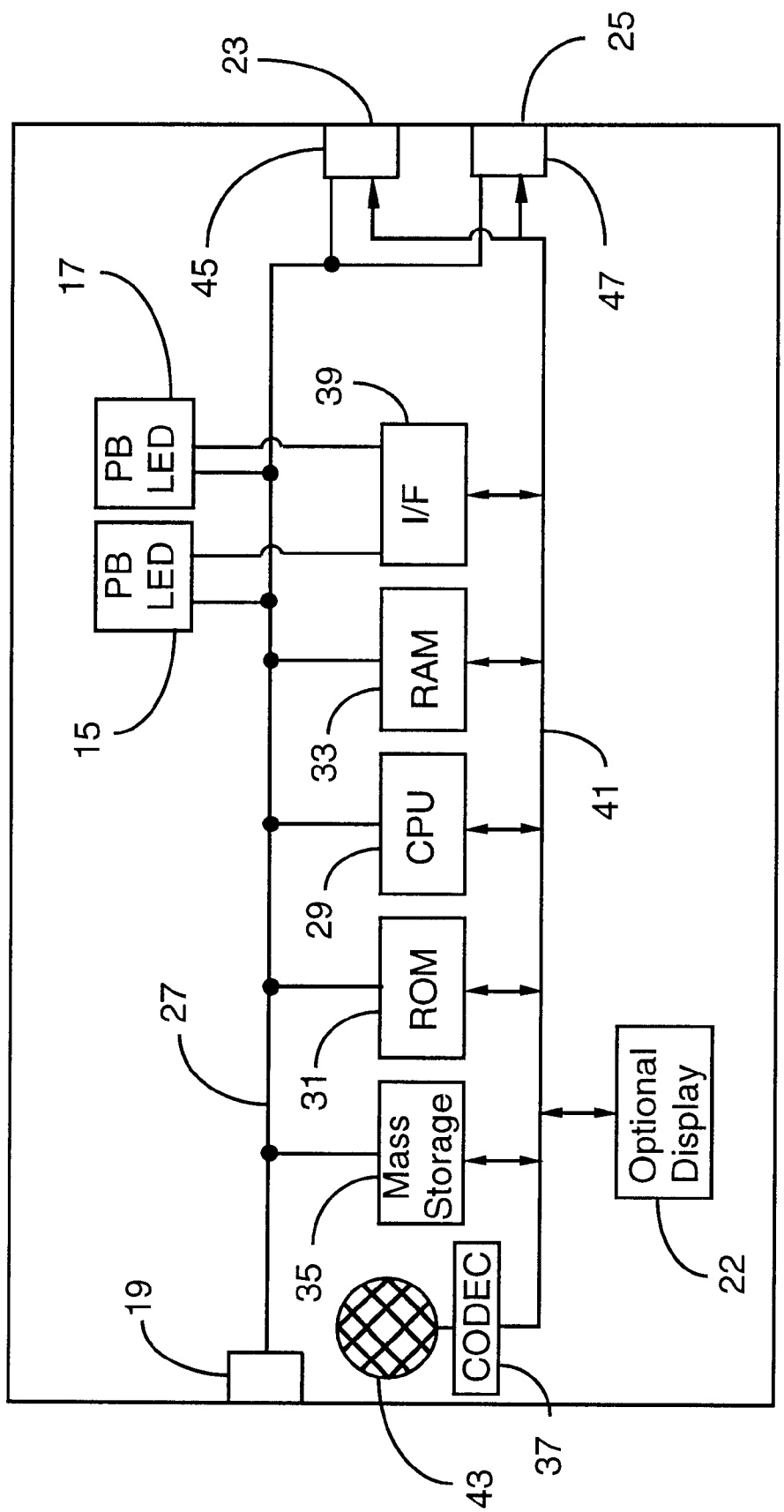
FIG. 2 is a block diagram of internal hardware and connectivity of the Electronic Document Answering Machine of FIG. 1.

FIG. 2 is a block diagram of internal hardware and connectivity for the Electronic Document Answering Machine of FIG. 1 with a speaker and/or a display. DC input port 19 is connected in parallel to each of the power-using elements through power lines 27. A CPU 29, a ROM 31, a RAM 33, a mass storage device 35, a CODEC 37, and a switch interface 39, are all interconnected over an internal bus 41. CODEC 37 drives speaker 21 for message playback. Optional display 22 is shown to be used either with or instead of speaker 21 LED pushbuttons 15 and 17 described above connect to CPU 29 through Interface 39 and bus 41. Modem 45 connects to phone plug 23 (see also FIG. 1), and serial port circuit 47 connects to serial port connector 25 as well as to bus 41. All internal components are shown as discrete devices in FIG. 2, but different combination of the internal circuitry elements shown may be implemented in some embodiments in common in IC circuitry.

Non-volatile storage unit 35 may take one or more of several well-known forms, such as hard disk drive (HDD), Flash memory, electrically-erasable programmable readonly memory (EEPROM), and the like. The modem may be analog or ISDN.

Depending on use and construction, in some embodiments a modular design makes the ROM, Mass storage and Modem type user upgradeable. This allows service providers to preprogram specifics of their services, or even do point-of-sales programming of user parameters, providing plug-and-play network access.

In a preferred embodiment operating code is embedded in ROM 31. This operating code includes in this embodiment a miniature operating system allowing a host PC connected over serial port 47 to access the Electronic Document Answering Machine lake a file server. CPU 29 is programmed to provide file server functions as well as to serve as a microcontroller for answering machine functions. In addition, modem 45 is implemented without a separate microcontroller, and CPU 29 performs modem functions for modem 45 as well. There are in addition embedded Internet Access code and Browser code in this embodiment (although not all functions described are necessarily provided in every embodiment.

Most functions are in embedded ROM and execute-inplace rather than being loaded to RAM for execution. Extended hook tables allow code to be redirected at mass storage 35 for upgrades and fixes, as well as for flexibility. Careful selection of components and careful design, such as eliminating the modem CPU, using flash memory (preferably voice grade with ECC), use of power management techniques, and so firth, allow the unit to be powered by DC wall plug instead of the host PC power supply or an on-board conversion power supply. This is an important consideration for the unique activity of the Electronic Document Answering Machine.

The embedded code for the Electronic Document Answering Machine executed by CPU 29 provides a number of unique functions. For example, the host PC no longer has to perform the functions of E-Mail access and presentation on an ongoing basis. This function is carried out by the intelligence of the Answering Machine. While the host PC connected through serial port 47 is on an there is normal activity (presumably the host is being regularly used by an operator), the Electronic Document Answering Machine under this full-use circumstance accesses the Internet and downloads any available user e-mail from one or post office servers having addresses programmed into the unit.

When a user shuts down the machine, or stops working (sensed as by power management programming on the host), the Electronic Document Answering Machine reduces download frequency according to optimal rules taking into account for example time of day/month/year, holidays, etc.

Thus, when the user is active at his machine, the mail arrives without delay, but cost is saved when there is no need to immediately receive mail.

The Electronic Document Answering Machine in this embodiment need not be connected to the host in addition to another modem. The Electronic Document Answering Machine assumes a transparent mode when needed by a user/operator at the host PC, and behaves as a modem of its respective class.

In this embodiment World Wide Web (WWW) pages are programmed for cached pre-fetching, notifying the user of new material being available. The unit can also could receive FAX and Voice messages, offering a multitude of programmable mail boxes.

In operation, a user turns on the Electronic Document Answering Machine by pushbutton 15. When on, the preprogrammed and embedded functions operate on a continuous basis as needed. When messages are received and stored, such as e-mail or WWW pages regularly accessed, the system illuminates or blinks the LED in pushbutton 17 informing the user/operator that mail or other messages are waiting. Importantly, all services of the Electronic Document Answering Machine work whether the host PC is on or off.

In the case of e-mail, voice mail, fax and the like, that is, all non-graphic messages, activating pushbutton 17 causes the messages to be played over speaker 21. The messages stay in memory though, until downloaded to the host PC or erased by intention. Downloaded WWW pages are cached until the host PC is turned on and the pages are loaded to the PC for display. Alternatively, even printed material on a WWW page may be vocalized, and in some embodiments, specific portions of specific pages may be flagged for vocalization as messages. Caller ID functions in some embodiments are integrated into the functionality of the E-Mail-Answering Machine.

In alternative embodiments an LCD display is added and messages can then be displayed on the LCD (by scrolling for longer messages) as well as, or instead of, being rendered vocally by voice synthesis, as described above. In these embodiments a display is connected to bus 41 and is controlled by CPU 29 in concert with display circuitry.

Figure 3:
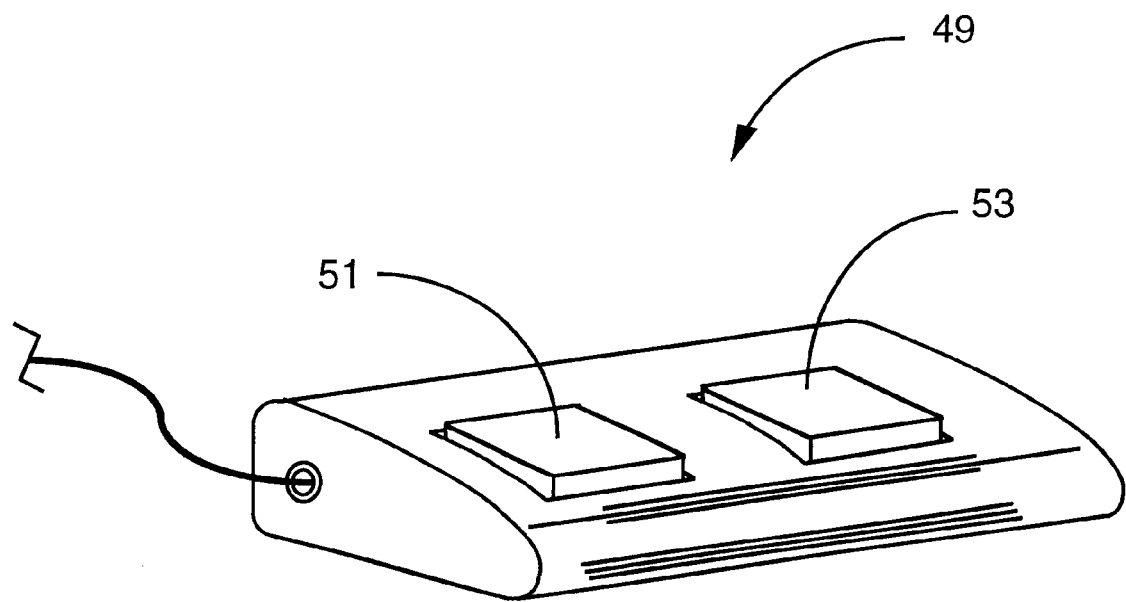
FIG. 3 is an isometric view of an Electronic Document Answering Machine according to an alternative embodiment of the present invention.

In an alternative embodiment the Electronic Document Answering Machine is implemented using components of the host PC for CPU, memory, speaker, modem, and the like. In this embodiment a speaker is added if the host does not have an adequate speaker, and an LED and an initiation pushbutton is added or dedicated to use by the E-Mail answering system. An alert LED 51 and a pushbutton 53 is implemented in some embodiments of this sort in a small box 49 which is attached to the host computer (FIG. 3). The extra box, while recognizable and convenient, is not absolutely necessary in this embodiment. The components needed (pushbutton, alert LED) can be placed elsewhere, such as in a specialized interface on the host computer box, monitor, keyboard and the like. The interface can be on any convenient apparatus at the user's normal workstation.

The specialized software in this embodiment runs on the host PC, and the elements necessary for operation are integrated with the operating modes of the PC in such a way that the answering machine functions operate in power-saving modes as well as when the computer is full-on. For example, the Electronic Document Answering Machine functions operate when the monitor is powered down, and when the computer itself is in standby or suspend modes.

Figure 4:
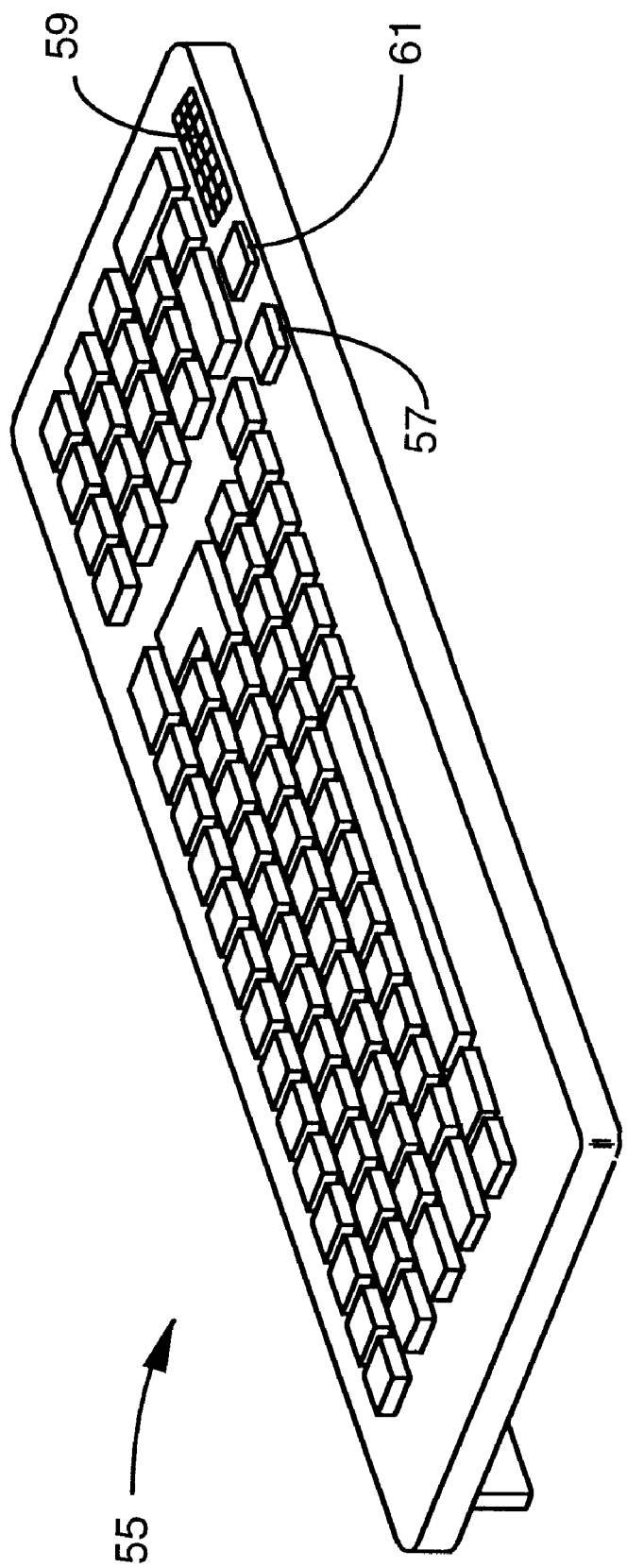
FIG. 4 is an isometric view of a keyboard with an Electronic Document Answering Machine interface according to an embodiment of the present invention.

Referring now to FIG. 4, in some embodiments of the sort described immediately above, the standard keyboard of the host PC is switched for a keyboard 55 having an Electronic Document Answering Machine interface, this being at the minimum an extra key or pushbutton 57, a speaker 59 (if the PC host speaker is not adequate or usable) and an LED 61 to provide the alert function for mail waiting. The Electronic document answering keyboard can have the interface at any convenient location.

In the special keyboard embodiment of the Electronic Document Answering Machine the answering machine interface operates when the host system is in power-saving modes as well as when it is full-on. A single keystroke delivers all messages in order of preprogrammed preference.

In some embodiments of this sort a special keyboard is not required. Instead, a little-used key (scroll lock, for example) is dedicated to initiate playback of messages, and a little-used LED (scroll-lock LED for example) is dedicated as the Answering Alert LED.

So in many embodiments of the machine the Electronic Document Answering Machine external elements are reduced to a single button (key, etc.) and a single alert signaler (LED, etc.).

In all of these alternative embodiments there are two alternative modes of operation. In the first mode, messages and other digital docs are downloaded from external sources (Internet, Remote Office Net), and stored. When new docs are downloaded the alert is activated. Toggling the pushbutton dedicated to answering machine functions then causes the messages to be vocalized and/or displayed. Each successive pressing of the button brings a new message to the fore.

In the second operating mode messages are not downloaded on a scheduled basis, but when the activating button is depressed, the system accesses the programmed remote mailbox(es) and downloads the messages. When the downloading process is done the alert is activated. Each successive depression of the pushbutton then reads (opens/plays) a message in the order the messages were retrieved.

The Electronic Document Answering Machine in various embodiments is integrated with existing services. For example, with Microsoft Mail™, CC-Mail™, and Microsoft Exchange™ on networks two modes are used as above. If software is active, MAPI is used to check status of the mail. Intervals are forced by software. If mail is not present, the E-Mail functions are launched at a predetermined time to get mail, then service continues as above.

With Microsoft Exchange™ on the Internet and/or Remote Access, MAPI is used to determine whether pickup is scheduled (normally not). At predetermined times the mail is picked up (7:30 AM; 1:00 PM; 4:00 PM; for example).

For Eudora™ and Netscape on the Internet file directory signature is used to determine changes in mail (no MAPI support). At predetermined times the mail is picked up. For proprietary packages on the Internet the same approach is used as for Eudora™ described above. This requires user setup of files. Compuserve™ integration is done by the same approach as for Eudora™ as well. The same is true for AOL™. As many options as possible are autodetected on installation.

Figure 5:
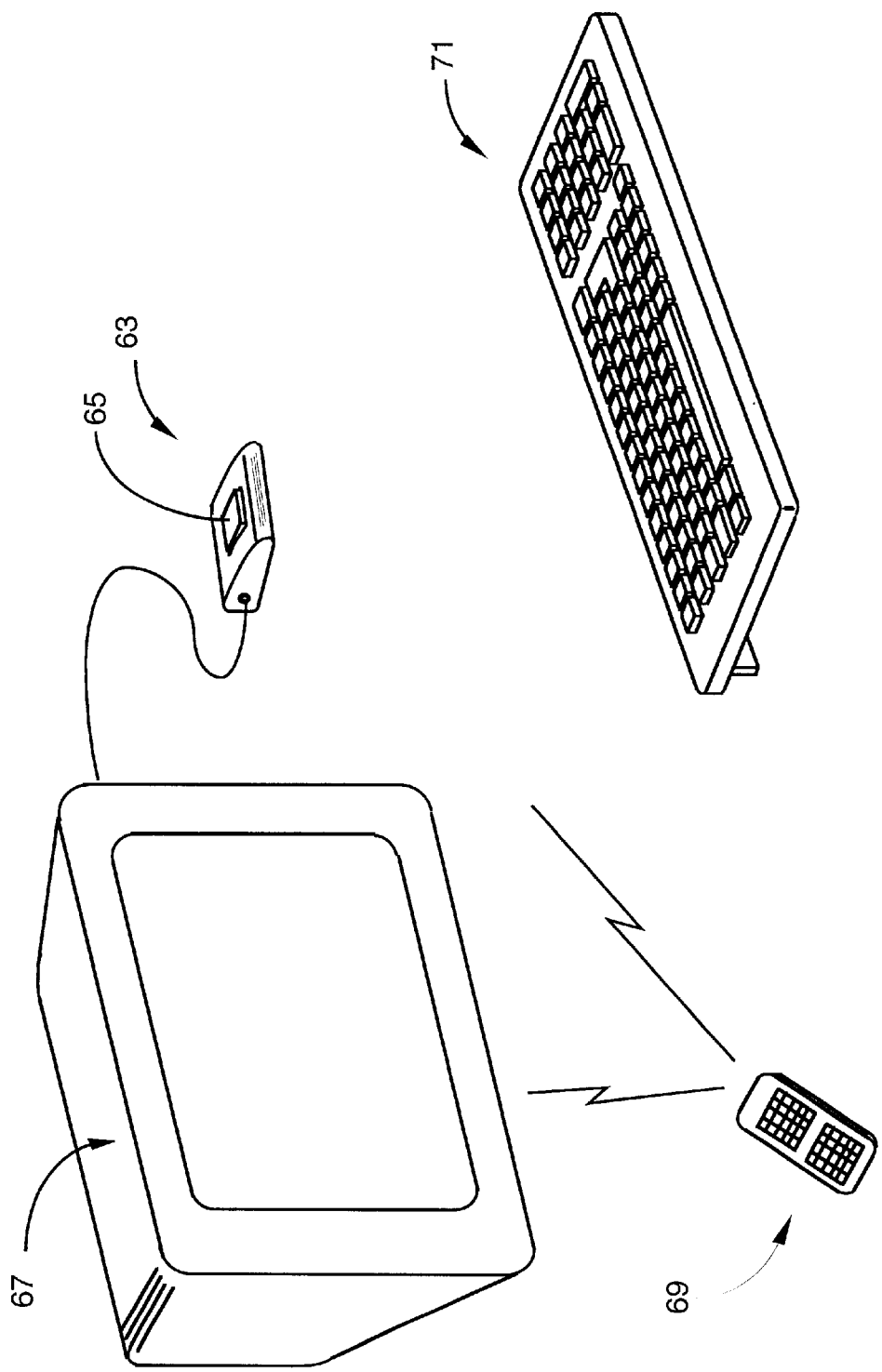
FIG. 5 is an isometric view of an Electronic Document Answering machine implemented as a set-top box in an alternative embodiment of the present invention.

Referring now to FIG. 5, the Electronic Document Answering Machine in yet another alterative embodiment is implemented in a small box 63 that is placed on top of a TV 67 (set-top box). In this embodiment the box has a light 65 for the alert function and many of the elements of the embodiment of FIG. 2. Specifically this set top unit has a CPU, mass storage, small RAM, ROM with embedded code, an inteconnecting bus, and a modem connecting to a phone line for Internet access. It also has an infrared interface so the activation function can be done from a remote 69, such as is common with TV control. The light or LED provides the alert function.

In this embodiment the Electronic Document Answering Machine periodically connects to the Internet and downloads e-mail, other messages, and WEB pages as preprogrammed. At each access, if new material is downloaded, the alert is activated. The user need only tune to a video input channel and access messages and the like via a button on the remote controller. In some TV integrated embodiments a keyboard 71 may be provided, which can be infra-red connected, other wireless, or wired directly to the set-top box, for use in composing answers to e-mail and the like. This implementation requires some special settings for a service provider, such as conversions of attachments and the like.

In still another embodiment of the Electronic Document Answering Machine is combined with a soft-modem. In this embodiment a second line can be added having a reduced baud rate (9,600 or 14,400 bps). This allows a small office/home office (SOHO) system with separate outgoing messages on the two lines (one private, one business), as well ability to receive faxes on both lines. E-mail and WEB-surfing is done with the faster of the two.

To accomplish the SOHO system, the top level software makes use of hardware buffering capabilities of the chips, as well as combining both lines onto a single interrupt, which allows exclusive access during extended periods of time. A single chip in this embodiment controls two CODECs and two line interfaces. In this manner the system can receive a fax while picking up e-mail on the other line.

It will be apparent to those with skill in the art that there are many alterations that may be made in embodiments described without departing from the spirit and scope of the invention. For example, it is preferable that an operating system and operating code for the free-standing external embodiments be embedded in ROM, but this is not material to the invention. There are many ways the operating code may be implemented as well. It is well-known that there are many individual preferences among programmers for code to perform very similar functions. There are similarly many alternative ways the functions defining an Electronic Document Answering Machine according to embodiments of the present invention may be combined, providing transparent e-mail and Internet access while alerting a user to availability of new material to be assimilated. Other alterations within the spirit and scope of the invention will occur to those with skill in the art.

What is claimed is:

1. A dedicated electronic document answering machine, not a PC and integrated separately from functional elements of a PC, comprising:

a CPU and memory connected by a communication bus;

a modem connected to the bus responsive to the CPU and connecting to remote sources on a telephone line;

an on-board system to communicate downloaded documents to a user independent of any peripheral device;

an alert apparatus to signal a user that new documents are waiting to be reviewed;

an input device to signal the system to communicate the new documents to the user;

a programing interface to program remote sources to be accessed for the electronic documents and periodic time intervals for access and downloading; and a digital port for connecting to a host personal computer (PC);

wherein the sole functions of the machine are to connect to the remote sources automatically at the programmed periodic time intervals; to initiate the downloading of the electronic documents including e-mail documents, to alert the user to the presence of downloaded documents, to communicate the documents to the user on demand using the outboard system for communicating, and to communicate stored documents to the PC for processing.

2. The dedicated electronic document answering machine of claim 1 wherein the on-board system for communicating comprises a speaker and voice synthesis apparatus, whereby text documents are rendered as speech and played for the user.

3. The dedicated electronic document answering machine of claim 1 wherein the on-board system for communicating comprises a display apparatus.

4. The dedicated electronic document answering machine of claim 1 adapted for use by the PC as a modem.

5. The dedicated electronic document answering machine of claim 1 wherein the modem is operated by the CPU and has no separate CPU.

6. The dedicated electronic document answering machine of claim 1 wherein the remote sources include an Internet mail server, and downloaded documents include e-mail addressed to a particular user.

7. The dedicated electronic document answering machine of claim 1 wherein the alert apparatus is an LED and the input apparatus is a pushbutton having the LED integrated in the pushbutton.

8. The dedicated electronic document answering machine of claim 7 further comprising a second pushbutton adapted for applying and removing power to power-using elements of the Machine.

9. A dedicated electronic document answering machine integrated into a keyboard for a computer, comprising:

a CPU and memory connected by a communication bus;

a modem connected to the bus responsive to the CPU and connecting to remote sources on a telephone line;

an on-board system to communicate downloaded documents to a user independent of any peripheral device;

a pushbutton with a built-in LED, the pushbutton providing a user input to initiate communicating the document to the user and the LED to alert the user to the presence of documents to be communicated; and a programming interface to program remote sources to be accessed for the electronic documents and periodic time intervals for access and downloading;

wherein the sole functions of the machine are to connect to the remote sources automatically at the programmed periodic time intervals; to initiate the downloading of the electronic documents including e-mail documents, to alert the user to the presence of downloaded documents, and to communicate the documents to the user on demand using the on-hoard system for communicating.

10. The dedicated electronic document answering machine of claim 9 wherein the digital documents include e-mail addressed to the PC user.

11. The dedicated electronic document answering machine of claim 9 wherein the alert apparatus is an LED in a standard keyboard adapted to serve as the alert apparatus, and the input apparatus is a standard key on the keyboard adapted to serve as the pushbutton.

* * * * *